United States Patent
Hong

(10) Patent No.: US 8,553,360 B2
(45) Date of Patent: Oct. 8, 2013

(54) MAGNETIC RECORDING HEAD HAVING WRITE POLE WITH HIGHER MAGNETIC MOMENT TOWARDS TRAILING EDGE

(75) Inventor: Liubo Hong, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 348 days.

(21) Appl. No.: 12/634,547

(22) Filed: Dec. 9, 2009

(65) Prior Publication Data
US 2011/0135959 A1   Jun. 9, 2011

(51) Int. Cl.
*G11B 5/147* (2006.01)
*G11B 5/187* (2006.01)

(52) U.S. Cl.
USPC ............ 360/125.03; 360/125.06; 360/125.07; 360/125.08; 360/125.12

(58) Field of Classification Search
USPC ............ 360/125.03, 125.06, 125.08, 125.12, 360/125.04, 125.07, 125.41, 125.44, 125.45
See application file for complete search history.

(56) References Cited

U.S. PATENT DOCUMENTS

| | | | |
|---|---|---|---|
| 4,807,076 A | 2/1989 | Nakashima et al. | |
| 6,693,768 B1 | 2/2004 | Crue et al. | |
| 6,809,901 B2 * | 10/2004 | Minor | 360/125.12 |
| 6,912,106 B1 * | 6/2005 | Chen et al. | 360/125.42 |
| 7,006,326 B2 | 2/2006 | Okada et al. | |
| 7,042,682 B2 | 5/2006 | Hu et al. | |
| 7,159,302 B2 | 1/2007 | Feldbaum et al. | |
| 7,180,705 B2 | 2/2007 | Matono et al. | |
| 7,212,379 B2 | 5/2007 | Hsu et al. | |
| 7,245,454 B2 | 7/2007 | Aoki et al. | |
| 7,248,437 B2 | 7/2007 | Yazawa et al. | |
| 7,251,878 B2 | 8/2007 | Le et al. | |
| 7,253,991 B2 | 8/2007 | Fontana, Jr. et al. | |
| 7,253,992 B2 | 8/2007 | Chen et al. | |
| 7,324,304 B1 | 1/2008 | Benakli et al. | |
| 7,327,533 B2 | 2/2008 | Guan | |
| 7,343,668 B2 | 3/2008 | Kobayashi | |

(Continued)

FOREIGN PATENT DOCUMENTS

| | | |
|---|---|---|
| EP | 1835489 A2 | 9/2007 |
| JP | 3209609 A | 9/1991 |
| JP | 6329311 A | 11/1994 |
| JP | 2009076127 A | 4/2009 |

OTHER PUBLICATIONS

S. Wang, E. Louis, J. Wolfson, R. Anderson, and M. H. Kryder, A Perpendicular Contact Recording Head with High Moment Laminated FeAin/NiFe Pole Tips, IEEE Transactions on Magnetics, Nov. 1994, pp. 3897-3899, Vol. 30, No. 6.

(Continued)

*Primary Examiner* — Jefferson Evans
(74) *Attorney, Agent, or Firm* — Patterson & Sheridan, LLP

(57) ABSTRACT

Embodiments of the invention provide a magnetic recording head including a write pole having increasing magnetic moment from a leading edge of the write pole to a trailing edge of the write pole, and methods for manufacturing the same. The write pole may be formed with a plurality of different magnetic material layers having different magnetic moments. A first magnetic layer may be formed with a first magnetic material adjacent a leading edge of the write pole. A second magnetic layer having a greater moment may be formed on the first magnetic layer, thereby increasing the magnetic moment from the leading edge of the write pole to the trailing edge of the write pole.

18 Claims, 15 Drawing Sheets

(56) References Cited

U.S. PATENT DOCUMENTS

| | | | |
|---|---|---|---|
| 7,365,942 B2 | 4/2008 | Sasaki et al. | |
| 7,375,925 B2 | 5/2008 | Sasaki et al. | |
| 7,394,621 B2 | 7/2008 | Li et al. | |
| 7,417,824 B2 | 8/2008 | Kameda | |
| 7,417,825 B2 | 8/2008 | Sasaki et al. | |
| 7,430,095 B2 | 9/2008 | Benakli et al. | |
| 7,436,628 B2 | 10/2008 | Kameda et al. | |
| 7,440,230 B2 | 10/2008 | Hsu et al. | |
| 7,443,633 B2 | 10/2008 | Tagami et al. | |
| 7,457,080 B2 | 11/2008 | Watabe et al. | |
| 8,228,633 B1 * | 7/2012 | Tran et al. | 360/125.07 |
| 2002/0131203 A1 * | 9/2002 | Litvinov et al. | 360/125 |
| 2003/0016470 A1 * | 1/2003 | Minor et al. | 360/125 |
| 2003/0193742 A1 * | 10/2003 | Matono et al. | 360/126 |
| 2005/0219743 A1 | 10/2005 | Guan et al. | |
| 2005/0259357 A1 * | 11/2005 | Kameda | 360/126 |
| 2006/0132972 A1 * | 6/2006 | Tagami et al. | 360/126 |
| 2007/0285837 A1 | 12/2007 | Im et al. | |
| 2008/0019045 A1 | 1/2008 | Otagiri et al. | |
| 2008/0198508 A1 * | 8/2008 | Nishikawa | 360/125.02 |
| 2008/0297953 A1 | 12/2008 | Matono et al. | |
| 2008/0316653 A1 | 12/2008 | Sasaki et al. | |
| 2009/0059426 A1 | 3/2009 | Sasaki et al. | |
| 2009/0122445 A1 | 5/2009 | Jiang et al. | |
| 2009/0225465 A1 * | 9/2009 | Iwasaki et al. | 360/75 |
| 2009/0297946 A1 | 12/2009 | Yue et al. | |
| 2011/0134568 A1 | 6/2011 | Chen et al. | |
| 2011/0134569 A1 | 6/2011 | Allen et al. | |
| 2011/0135962 A1 | 6/2011 | Hong | |
| 2011/0216443 A1 * | 9/2011 | Hirata et al. | 360/123.12 |

OTHER PUBLICATIONS

Lijie Guan, Joe Smyth, Moris Dovek, Sui-Yan Chan, and Tatsuya Shimizu, A Trailing Shield Perpendicular Writer Design With Tapered Write Gap for High Density Recording, IEEE Transactions on Magnetics, Nov. 2008, pp. 3396-3399, Vol. 44, No. 11.

Hitachi Corporation and Jeffrey Lille, Non-magnetic metrology layer for perpendicular pole, IP.com Prior Art Database Technical Disclosure, Sep. 27, 2004, IP.com Electronic Publication IPCOM000031484D.

IBM TDB, T. J. Beaulieu and R. W. Wood, Improved Perpendicular Recording Head, IP.com Prior Art Database Technical Disclosure, Jan. 30, 2005, IP.com Electronic Publication IPCOM000037905D.

IBM TDB and T. A. Schwartz, Perpendicular Recording Read Write Head With High Reluctance Leg, IP.com Prior Art Database Technical Disclosure, original publication date: Sep. 1, 1981, IP.com Electronic Publication IPCOM000053181D dated Feb. 12, 2005.

* cited by examiner

MAGNETIC RECORDING HEAD HAVING WRITE POLE WITH HIGHER MAGNETIC MOMENT TOWARDS TRAILING EDGE

BACKGROUND OF THE INVENTION

1. Field of the Invention

Embodiments of the present invention generally relate to magnetic write heads, and more specifically to fabrication of magnetic write poles.

2. Description of the Related Art

Magnetic head-based systems have been widely accepted in the computer industry as a cost-effective form of data storage. In a magnetic disk drive system, a magnetic recording medium in the form of a disk rotates at high speed while a magnetic head "flies" slightly above the surface of the rotating disk. The magnetic disk is rotated by means of a spindle drive motor. The magnetic head is attached to or formed integrally with a "slider" which is suspended over the disk by a suspension assembly which in turn is attached to an actuator arm. As the magnetic disk rotates at an operating speed, the moving air generated by the rotating disk in conjunction with the physical design of the slider lifts the magnetic head, allowing it to glide or "fly" slightly above and over the disk surface on a cushion of air, referred to as an air bearing.

Magnetic disks are desirable mediums of storage because they are nonvolatile; i.e., no power is required to preserve the data. There has been increasing progress in the field of magnetic disk storage system technology in recent years. Such success has made storage systems an important component of modern computers. Some of the most important customer attributes of any storage system are the cost per megabyte, data rate, and access time. Improvements in areal density (the amount of information that can be placed within a given area on a disk drive), have been the chief driving force behind the historic improvement in storage cost. In fact, the areal density of magnetic disk storage systems continues to increase. As the magnetic particles that make up recorded data on a magnetic disk become ever smaller, technical difficulties in writing and reading such small bits occur.

Perpendicular recording is one approach to achieve larger areal densities when compared with longitudinal recording. In recent years, increased demand for higher data rate and areal density has driven the perpendicular head design to scale toward smaller dimensions and has resulted in a need for constant exploration of new head designs, materials, and practical fabrication methods.

Some of the problems encountered with perpendicular recording are side writing and side erasure to adjacent tracks on the disk. These problems occur from leakage and fringing of the magnetic flux from the magnetic write head. To minimize these effects, one approach is to provide either a trailing or wrap-around shield on the magnetic write head. These shields allow effective magnetic flux to be provided for writing to the disk, while avoiding leakage and fringing that can lead to the above-described problems. As the areal density of the disks increases, however, the ability of existing shields to achieve the desired results decreases.

SUMMARY OF THE INVENTION

Embodiments of the present invention generally relate to magnetic write heads, and more specifically to fabrication of magnetic write poles.

One embodiment of the invention provides a method for fabricating a write pole of a magnetic recording head. The method generally comprises forming a first ferromagnetic layer having a first magnetic moment, patterning a mask layer on the first ferromagnetic layer proximate an air bearing surface of the magnetic recording head, and removing portions of the first ferromagnetic layer exposed by the mask layer. The method further comprises forming a second ferromagnetic layer adjacent to a sidewall portion of the first ferromagnetic layer, the second ferromagnetic layer having a second magnetic moment, and forming a third ferromagnetic layer on the first ferromagnetic layer and the second ferromagnetic layer, wherein the third ferromagnetic layer has a third magnetic moment greater than the first magnetic moment.

Another embodiment of the invention provides a method for fabricating a write pole of a magnetic recording head. The method generally comprises forming a first ferromagnetic layer having a first magnetic moment, patterning a mask layer on the first ferromagnetic layer proximate an air bearing surface of the magnetic recording head, and removing portions of the first ferromagnetic layer exposed by the mask layer, wherein removing the portions of the first ferromagnetic layer forms a tapered sidewall of the first ferromagnetic layer. The method further comprises forming a second ferromagnetic layer adjacent to a sidewall portion of the first ferromagnetic layer, the second ferromagnetic layer having a second magnetic moment, and forming a third ferromagnetic layer on the first ferromagnetic layer and the second ferromagnetic layer, wherein the third ferromagnetic layer has a third magnetic moment greater than the first magnetic moment.

Yet another embodiment of the invention provides a magnetic recording head comprising a write pole generally comprising a first ferromagnetic layer having a first magnetic moment, a second ferromagnetic layer formed adjacent to a sidewall portion of the first ferromagnetic layer, the second ferromagnetic layer having a second magnetic moment, and a third ferromagnetic layer formed on the first ferromagnetic layer and the second ferromagnetic layer, wherein the third ferromagnetic layer has a third magnetic moment greater than the first magnetic moment.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide a magnetic recording head including a write pole having increasing magnetic moment from a leading edge of the write pole to a trailing edge of the write pole, and methods for manufacturing the same. The write pole may be formed with a plurality of different magnetic material layers having different magnetic moments. A first magnetic layer may be formed with a first magnetic material adjacent a leading edge of the write pole. A second magnetic layer having a greater moment may be formed on the first magnetic layer, thereby increasing the magnetic moment from the leading edge of the write pole to the trailing edge of the write pole.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
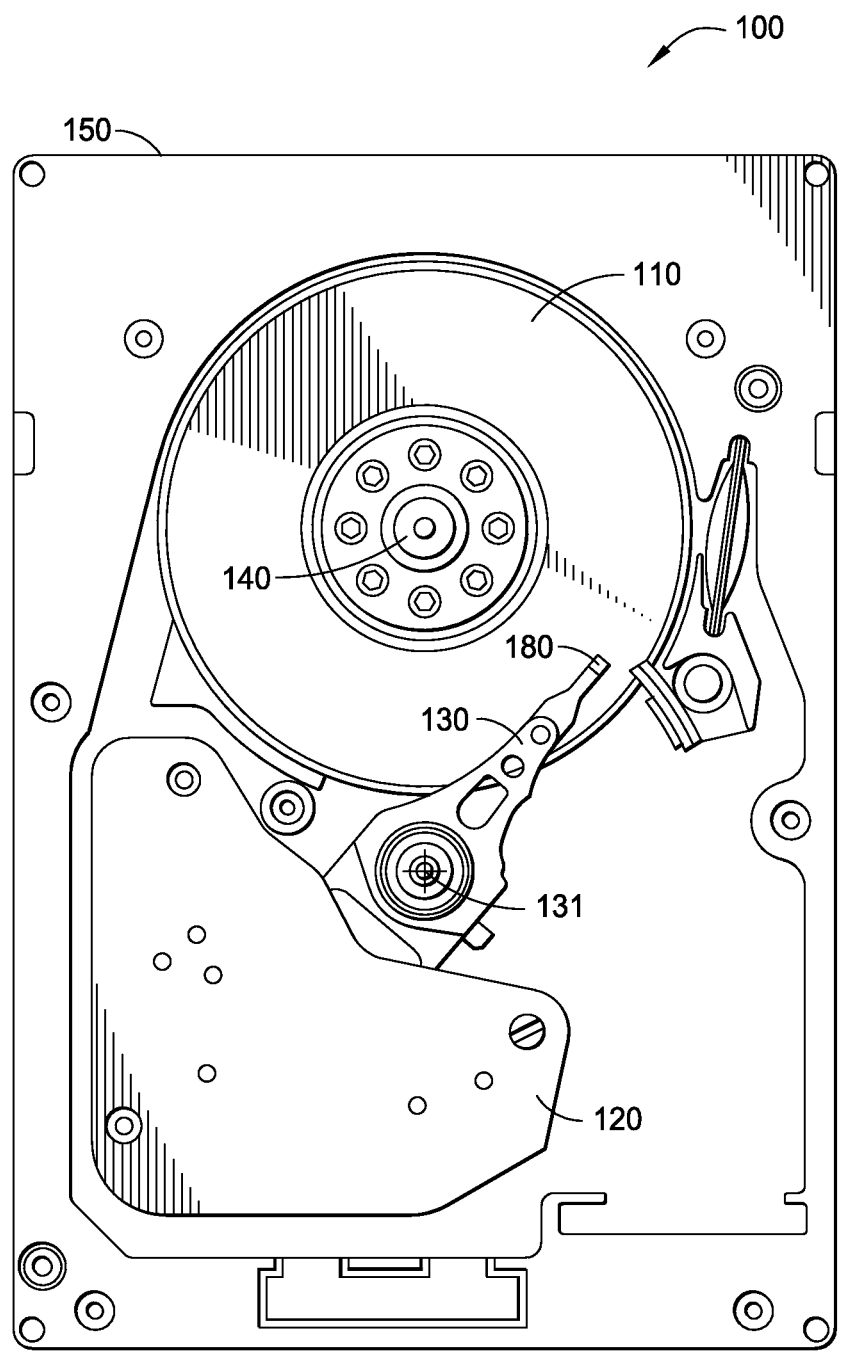
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. An electromagnetic head 180 may be positioned on a track. As each disk spins, data may be written and/or read from the data track. Electromagnetic head 180 may be coupled to an actuator arm 130 as illustrated in FIG. 1. Actuator arm 130 may be configured to swivel around actuator axis 131 to place electromagnetic head 180 on a particular data track.

A plurality of magnetic disks may be stacked vertically in HDD 100. Each disk may have read and write tracks on each side of the disk. Therefore, electromagnetic heads may be placed on both sides of the disk. In some embodiments, a single magnetic head may be configured to access data tracks on the bottom face of a first disk and a top face of a second disk.

Each actuator arm 130 may be coupled to actuator 120. Actuator 120 may be a motor configured to control the swiveling movement of actuator arm 130 to place electromagnetic head 180 on a given data track. In one embodiment, the actuator arms may be connected. Therefore, all the actuator arms 130, and consequently all the electromagnetic heads 180 may move together.

Spindle motor 140 may be configured to rotate the magnetic disks at a predetermined rate. For example, the spindle motor 140 may be configured to spin at a rate of 10,000 revolutions per minute (rpm). One skilled in the art will recognize however, that any reasonable spin rate may be employed. The spin rate for example may depend on the type of disk drive, the type of computer, etc.

Figure 2A:
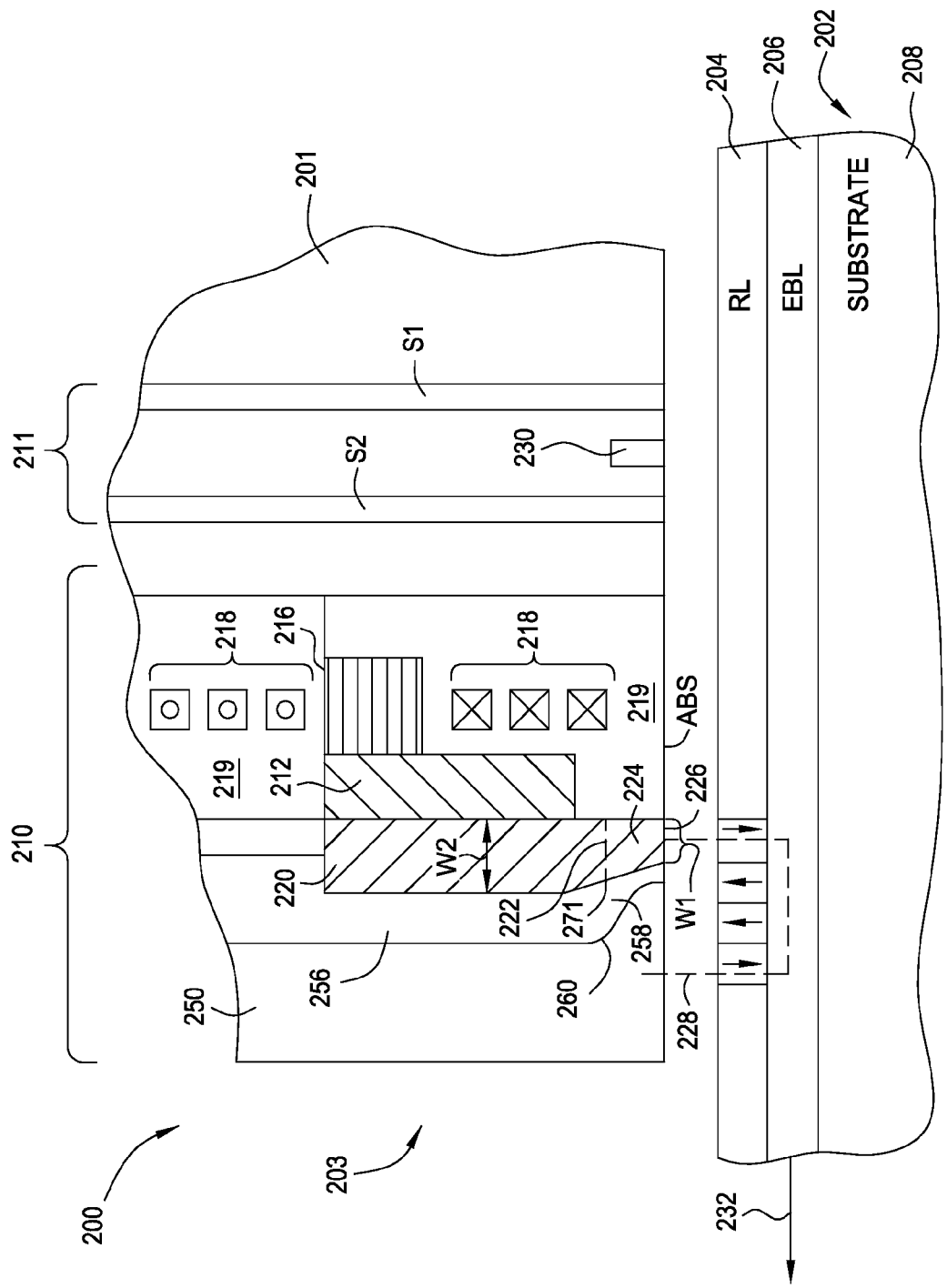
FIG. 2A is a side view of a read/write head and magnetic disk of the disk drive of FIG. 1, according to one embodiment of the invention

FIG. 2A is a fragmented, cross-sectional side view through the center of an embodiment of a read/write head 200 mounted on a slider 201 and facing magnetic disk 202. The read/write head 200 and magnetic disk 202 may correspond to the electromagnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (EPL) 206 formed on a disk substrate 208. The read/write head 200 includes an air bearing surface (ABS), a magnetic write head 210 and a magnetic read head 211, and is mounted such that its ABS is facing the magnetic disk 202. In FIG. 2A, the disk 202 moves past the write head 210 in the direction indicated by the arrow 232, so the portion of slider 201 that supports the read/write head 200 is often called the slider "trailing" end 203.

In some embodiments, the magnetic read head 211 is a magnetoresistive (MR) read head that includes an MR sensing element 230 located between MR shields S1 and S2. The RL 204 is illustrated with perpendicularly recorded or magnetized regions, with adjacent regions having magnetization directions, as represented by the arrows located in the RL 204. The magnetic fields of the adjacent magnetized regions are detectable by the MR sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. In an alternative embodiment, the yoke 216 may be omitted, and the coil 218 may wrap around the main pole 212. A write pole 220 (also referred to herein as "WP 220") is magnetically connected to the main pole 212 and has an end 226 that defines part of the ABS of the magnetic write head 210 facing the outer surface of disk 202.

Figure 2B:
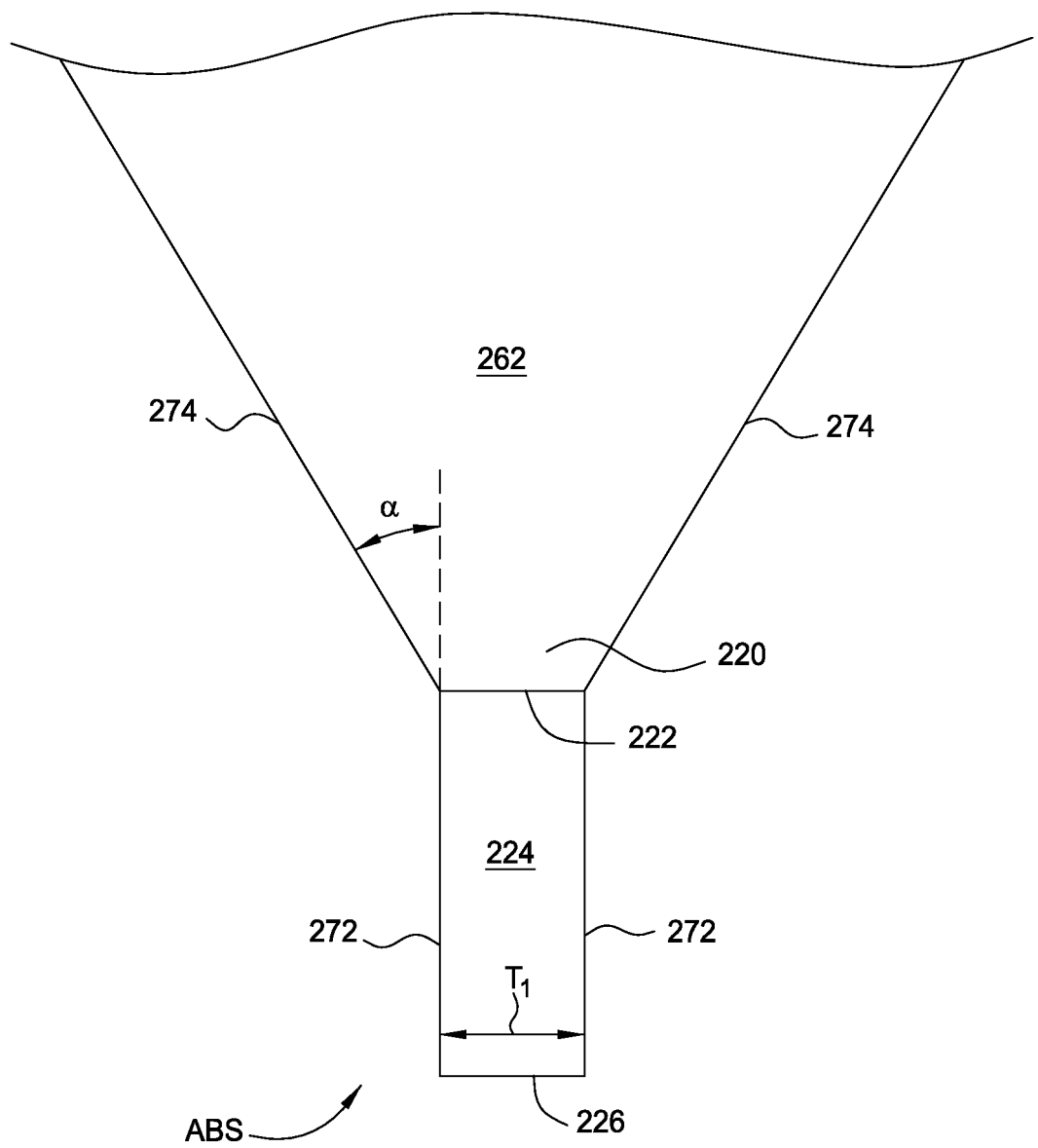
FIG. 2B is an enlarged top view of a portion of the read/write head of FIG. 2A, according to a further embodiment of the invention.

In some embodiments, write pole 220 is a flared write pole and includes a flare point 222 and a pole tip 224 that includes an end 226 that defines part of the ABS. In flared write pole embodiments, the width of the write pole 220 in a first direction (into and out of the page in FIG. 2A) increases from a first width at the flare point 222 to greater widths away from the ABS, as is shown in FIG. 2B. The flare may extend the entire height of write pole 220 (i.e., from the end 226 of the write pole 220 to the top of the write pole 220), or may only extend from the flare point 222, as shown in FIG. 2A. In one embodiment the distance between the flare point 222 and the ABS is between about 30 nm and about 150 nm.

In one embodiment of the invention, the WP 220 may be a tapered write pole. Accordingly, as illustrated in FIG. 2A, the WP 220 may include a tapered surface 271 which increases a width of the WP 220 from a first width W1 at the ABS to a second width W2 away from the ABS. In one embodiment, the width W1 may be between around 60 nm and 200 nm, and the width W2 may be between around 120 nm and 350 nm.

The WP 220 may be tapered at the surface 271 to improve magnetic performance. For example, by reducing the width W1 at the ABS may concentrate a magnetic field generated by the WP 220 over desirable portions of the magnetic disk 202. In other words, reducing the width W1 of the WP 220 at the ABS reduces the probability that tracks adjacent to a desirable track are erroneously altered during writing operations.

While a small width of the WP 220 is desired at the ABS, it may be desirable to have a greater width of the WP 220 in areas away from the ABS. A larger width W2 of the WP 220 away from the ABS may desirably increase the magnetic flux to the WP 220, by providing a greater thickness of the WP 220 in a direction generally parallel to the ABS. In operation, write current passes through coil 218 and induces a magnetic field (shown by dashed line 228) from the WP 220 that passes through the RL 204 (to magnetize the region of the RL 204 beneath the WP 220), through the flux return path provided by the EBL 206, and back to an upper return pole 250. In one embodiment, the greater the magnetic flux of the WP 220, the greater is the probability of accurately writing to desirable regions of the RL 204.

In one embodiment of the invention, the write pole 220 may be formed with a plurality of different magnetic materials having different magnetic moments. Specifically, the write pole 220 may be fabricated such that the magnetic moment of the write pole increases from the leading edge of the write pole to the trailing edge of the write pole. Such variations in magnetic moment of the write pole 220 may result in a desirable greater write field gradient near the trailing edge of the write pole and reduced fringing effects. The fabrication of a write pole 220 with a plurality of magnetic materials having different magnetic moment is discussed in greater detail below.

FIG. 2A further illustrates one embodiment of the upper return pole or magnetic shield 250 that is separated from WP 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2A is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the WP 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2A. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a greatest thickness at a second distance (greater than the first distance) from the ABS.

FIG. 2B shows an enlarged top view of the WP 220 of FIG. 2A, with the shield layer 250 and the gap layer 256 removed to show details of the WP 220, according to an embodiment of the invention. The WP 220 includes flared sides 274, which extend from the flare point 222 away from the ABS, such that the main pole increases from a first width $T_1$ to greater widths in a direction away from the ABS.

In some embodiments, the first width, $T_1$ is between 20 nm and 150 nm. The flared sides 274 form an angle α with respect to a plane parallel to the ABS surface. In one embodiment α is between about 30° and about 60°. The flare point 222 may be between about 30 nm and about 150 nm from the ABS.

Figure 3A:
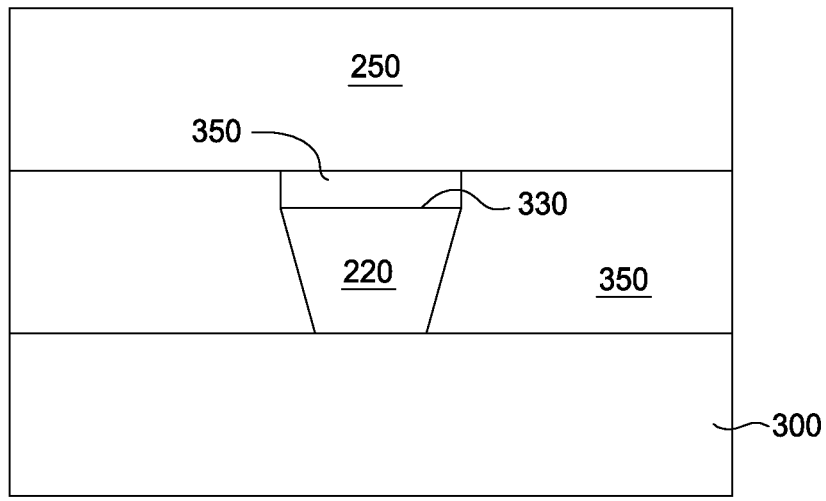
FIGS. 3A-B illustrate air bearing surface (ABS) views of exemplary write heads, according to an embodiments of the invention.

FIG. 3A illustrates an ABS view of the WP 220, according to an embodiment of the invention. As illustrated in FIG. 3A, the WP 220 may be formed on a substrate 300. The substrate 300 may include one or more components of the magnetic recording head such as, for example, the read head, one or more magnetic coils, and the like, formed therein. In one embodiment, the WP 220 may have a substantially trapezoidal cross section, as illustrated in FIG. 3A. FIG. 3 also illustrates a gap layer 350 formed along a trailing edge 330 of the WP 220.

Figure 3B:
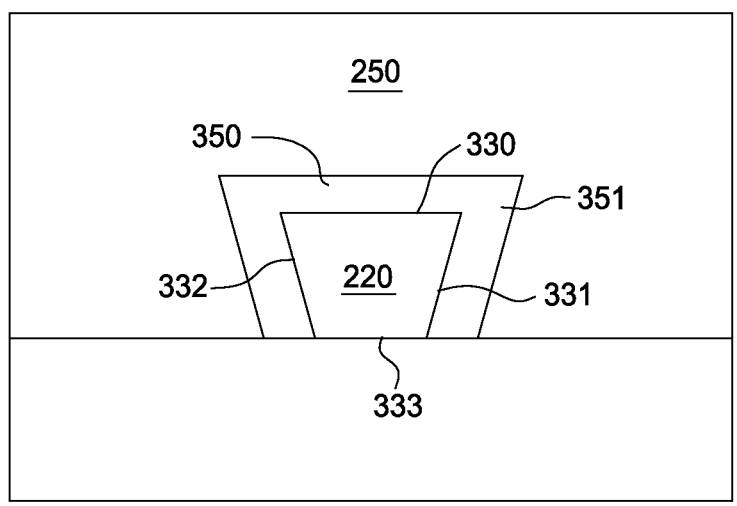

FIG. 3B illustrates an alternative embodiment in which a wrap-around shield is formed instead of a top shield. As illustrated in FIG. 3B, a gap layer 351 may be formed along the trailing edge 330 and sidewall portions 331 and 332 of the write pole 220. Furthermore, as illustrated in FIG. 3B, a top shield 250 is shown wrapping around the write pole 220, the gap layer 351 separating the shield 250 from the write pole 220.

Figure 4A:
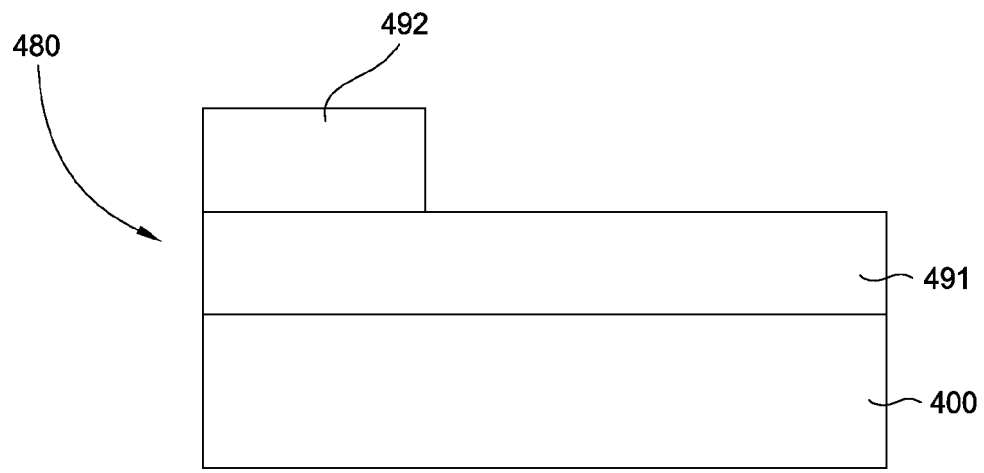
FIGS. 4A-V illustrate exemplary steps for fabricating a write head, according to an embodiment of the invention.

In one embodiment of the invention, the magnetic moment of the write pole 220 may increase from the leading edge 333 to the trailing edge 330. The increase in magnetic moment may be achieved by fabricating the magnetic pole 220 with a plurality of different magnetic materials with different magnetic moments. FIGS. 4A-V illustrate fabrication of a write pole according to an embodiment of the invention. As illustrated in FIG. 4A, fabrication may begin by providing a substrate 400 on which a first ferromagnetic layer 491 and a patterned mask layer 492 have been formed.

The first ferromagnetic layer 491 may be formed with a suitable ferromagnetic material having a first magnetic moment. Examples of materials that may be used to form the first ferromagnetic layer may include NiFe or CoFeNi alloys. In one embodiment, the magnetic moment of the first ferromagnetic layer may be between around 10 Kilo Gauss (KG) and 22 KG. The thickness of the first ferromagnetic layer 491 may be between 30 nm and 60 nm.

In one embodiment, the first ferromagnetic layer 491 may be formed as a single layer structure having the same ferromagnetic material. However, in alternative embodiments, the first ferromagnetic layer 491 may be formed with a plurality of ferromagnetic materials having similar magnetic moments. In one embodiment, the first ferromagnetic layer 491 may be a multi-layered stack including thick layers of ferromagnetic materials interleaved with thin non-magnetic layers composed of, for example, Chromium (Cr), Nickel-Chromium (NiCr), Ruthenium, and the like. The mask layer 492 may be formed with a photoresist material using conventional techniques. In one embodiment, the mask layer 492 may be used as a mask in an ion beam etching procedure to remove portions of the first laminate layer 491 that are exposed by the mask layer 492.

Figure 4B:
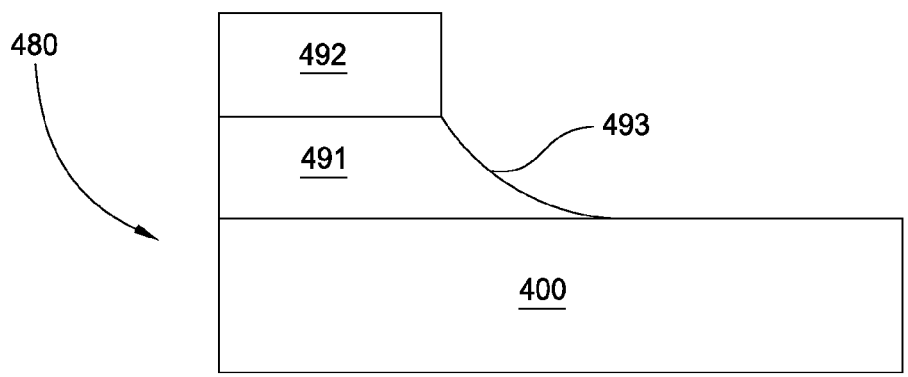

FIG. 4B illustrates the structure after the ion beam etching, according to an embodiment of the invention. As illustrated in FIG. 4B, the portions of the first ferromagnetic layer 491 that are not covered by the mask layer 492 may be removed, thereby exposing the substrate 400. As further illustrated, a tapered surface 493 may also be formed in the first ferromagnetic layer 491.

Figure 4C:
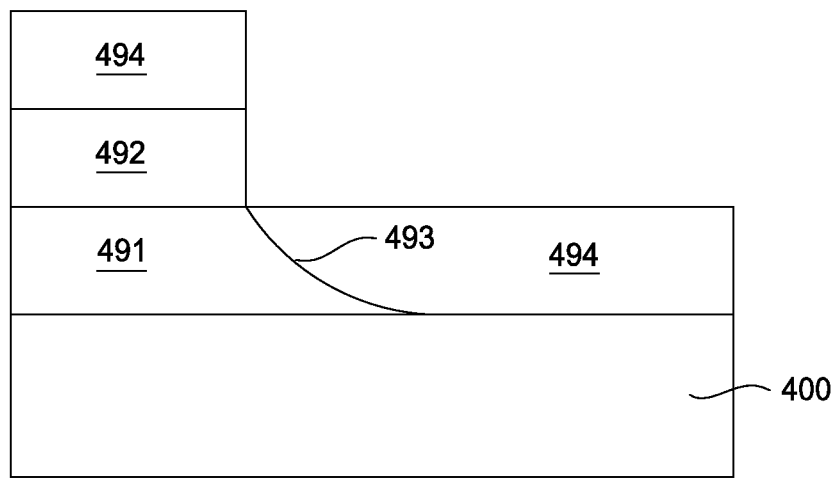
Figure 4D:
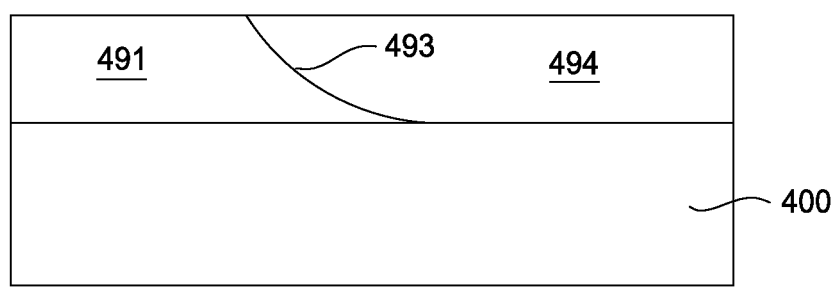

In one embodiment of the invention, a second ferromagnetic layer 494 may be deposited on the structure illustrated in FIG. 4B. The second ferromagnetic layer 494 may be deposited on the mask layer 492, exposed portions of the substrate 400 and on the tapered surface 493 of the first ferromagnetic layer 491, as illustrated in FIG. 4C. In one embodiment, the mask layer 492 may be removed along with the portions of the second ferromagnetic layer 494 deposited thereon. A CMP step may be used to remove fences or planarizes the layers 491 and 493, thereby forming the structure as illustrated in FIG. 4D.

In one embodiment, the second ferromagnetic layer 494 may have a higher magnetic moment than the first ferromagnetic layer 491. Particularly, the magnetic moment of the second ferromagnetic layer may be between around 22 KG and 24 KG. In one embodiment, the second ferromagnetic layer 494 may be formed with ferromagnetic materials such as CoFe or CoFeNi alloys. The second ferromagnetic layer 494 may have the same thickness as the first ferromagnetic layer 491.

Figure 4E:
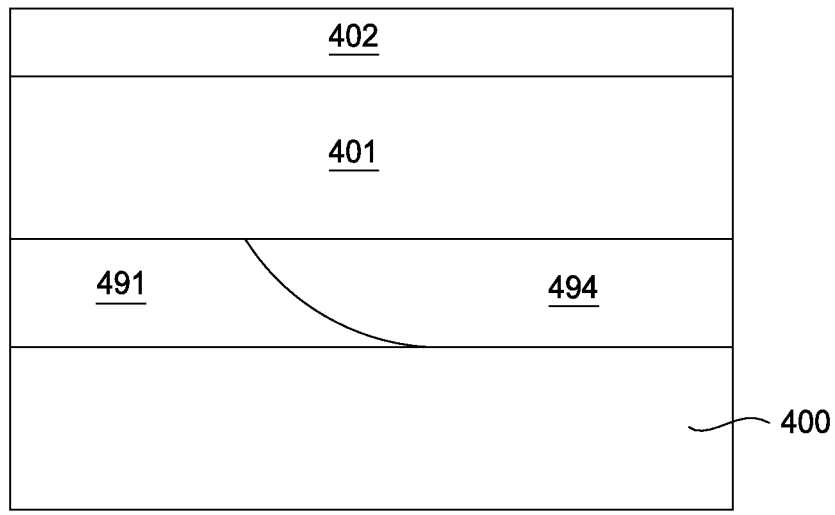

In one embodiment, a third ferromagnetic layer 401 and a reactive ion etching (RIE) stop layer 402 on the first ferromagnetic layer 491 and the second ferromagnetic layer 494, as illustrated in FIG. 4E. In one embodiment, a combination of the first ferromagnetic layer 491, the second ferromagnetic layer 494 and the third ferromagnetic layer 401 may be used to form a write pole, e.g., the write pole 220 of FIG. 2A. In one embodiment, the third ferromagnetic layer 401 may be composed of one or more ferromagnetic materials, for example, Cobalt-Iron (CoFe), Cobalt-Nickel-Iron (CoNiFe), or the like. In one embodiment, the third ferromagnetic layer 401 may have a thickness between around 90 nm and 300 nm. In one embodiment, the third ferromagnetic layer 401 may have a greater magnetic moment than the first ferromagnetic layer 491. For example, the magnetic moment of the third ferromagnetic layer 401 may be between 22 KG and 24 KG. In one embodiment the magnetic moment of the third ferromagnetic layer 401 may be greater than or equal to the magnetic moment of the second ferromagnetic layer 494.

The RIE stop layer 402 may be composed of a material that does not react with ions in a RIE process. Exemplary materials that may be used to form the RIE stop layer 302 include Chromium (Cr), Nickel-Chromium (NiCr), or the like. In one embodiment of the invention, the RIE stop layer 402 may have a thickness of around 3 nm to around 150 nm.

Figure 4F:
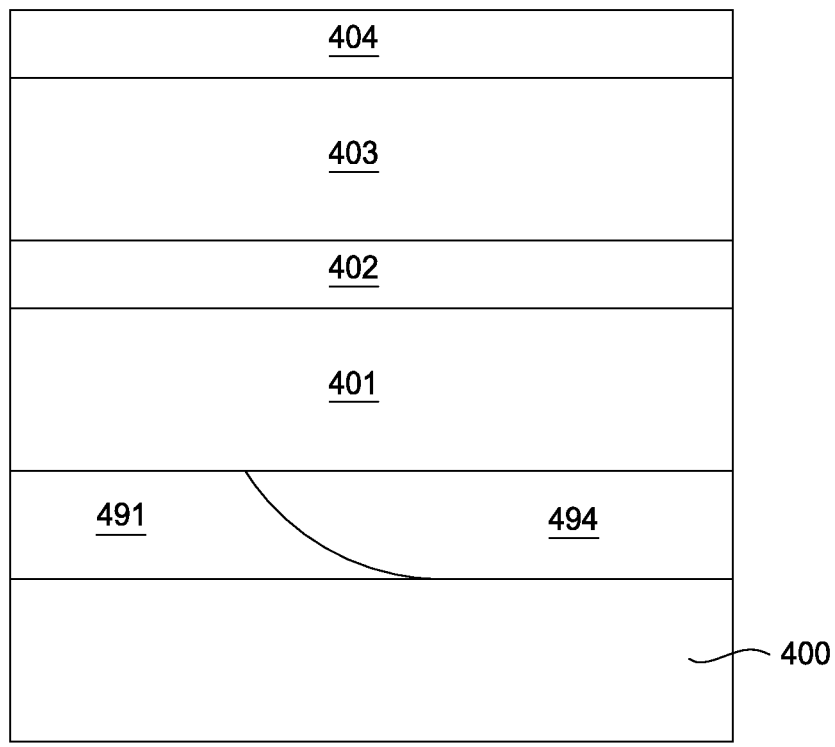

In one embodiment of the invention, a non magnetic layer 403 and a mask layer 404 may be deposited on the RIE stop layer 402, as illustrated in FIG. 4F. In one embodiment of the invention, the non-magnetic layer 403 may be formed with Silicon Carbide (SiC). Alternatively, the non-magnetic layer 403 may be formed with Aluminum Oxide ($Al_2O_3$), Tantalum (Ta), Tantalum Oxide (TaO), Diamond-like Carbon (DLC), Silicon dioxide ($SiO_2$), Silicon Nitride (SiN), or the like. In one embodiment of the invention, the non-magnetic layer 403 may have a thickness of around 100 nm to around 500 nm.

In one embodiment, the combination of the non-magnetic layer 403 and the RIE stop layer 402 may form a part of a gap layer, e.g., the gap layer 256 of FIG. 2A. Specifically, the non-magnetic layer 303 and the RIE stop layer may form a top bump layer that provides separation between a shield layer and the magnetic pole formed with the third ferromagnetic layer 401. Specifically, the top bump layer may be formed over a flared portion of the write pole. The mask layer 404 may be formed with Chromium, and may have a thickness of around 5 nm to around 50 nm, in one embodiment.

Figure 4G:
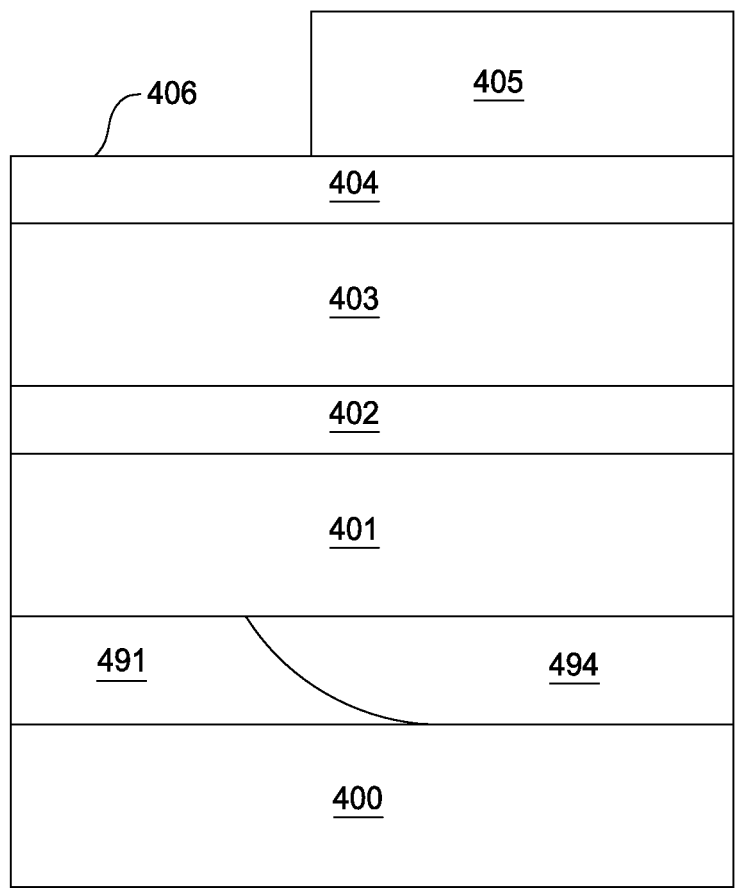
Figure 4H:
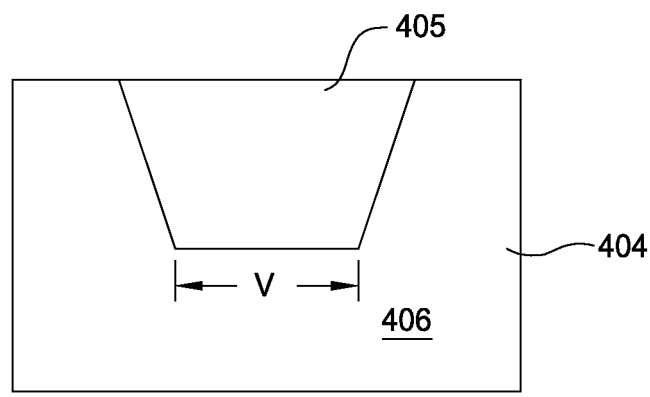
Figure 4:
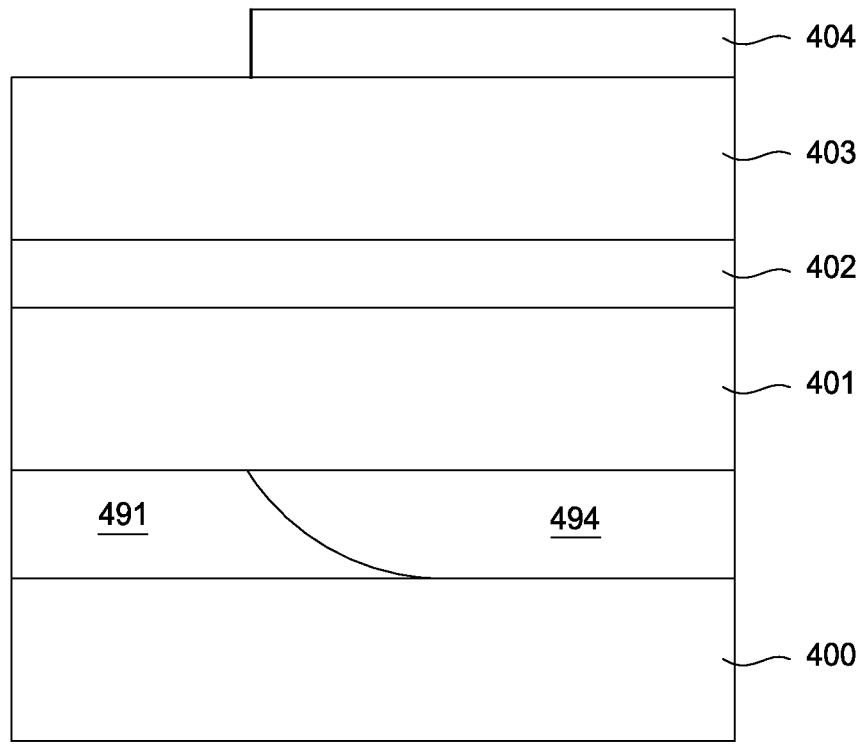

A resist mask 405 may be patterned on the mask layer 404, as illustrated in FIG. 4G. As further illustrated in FIG. 4G, the resist mask may expose a surface 406 of the mask layer 404. In one embodiment, the resist mask 405 may be composed of 193 resist, and may have a thickness between around 0.15 to 0.7 μm. FIG. 4H is a top view of the structure illustrated in FIG. 4G. As shown in FIG. 4H, the resist mask 405 may have a flared shape, which may correspond to the flared shape of a write pole that is being fabricated. As further illustrated, the resist mask 405 may have a minimum width V between around 0 μm and 1 μm.

Figure 4J:
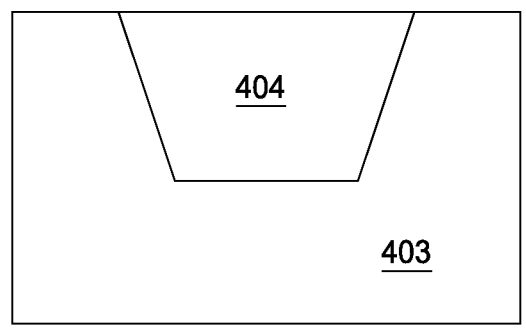

In one embodiment, the mask layer surface 406 that is exposed by the resist mask 405 may be removed in an ion milling process. Thereafter, the resist mask 405 may be stripped. The resulting structure is illustrated in FIG. 4I. As illustrated in FIG. 4I, a portion of the non-magnetic layer 403 may be exposed as a result of the ion milling. The portion of the mask layer 404 that was covered by the resist mask 405 still remains. FIG. 4J illustrates a top view of the structure after the milling step. As illustrated in FIG. 4J, the flared shape of the resist mask 405 (See FIG. 4H) may be transferred to the mask layer 404. Furthermore, the non-magnetic layer 403 is exposed as a result of the ion milling.

Figure 4K:
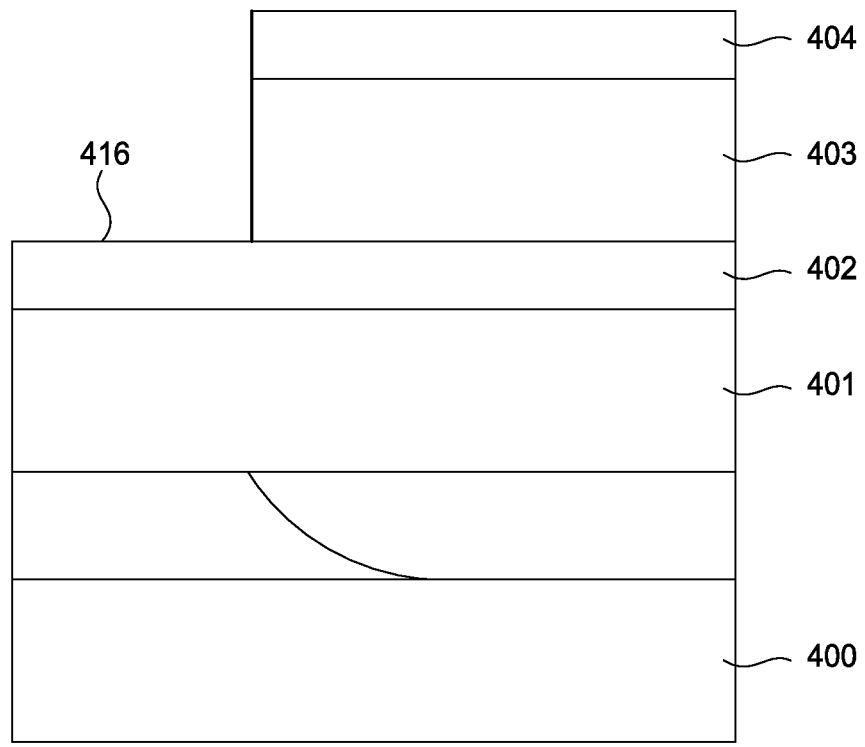
Figure 4L:
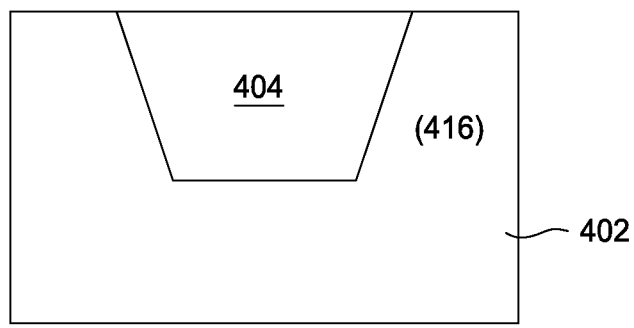

In one embodiment, the patterned mask layer 404 may be used as a mask, and the pattern thereof may be transferred to the non-magnetic layer 403 in a Reactive Ion Etching (RIE) process. FIG. 4K illustrates the structure after the RIE process. As illustrated, the RIE process may remove portions of the non-magnetic layer 403 that are not covered by the patterned mask layer 404, thereby exposing a surface 416 of the RIE stop layer 402. FIG. 4L illustrates a top view of the structure after the RIE process. As illustrated in FIG. 4L, the RIE process may expose a surface 416 of the RIE stop layer 402.

Figure 4M:
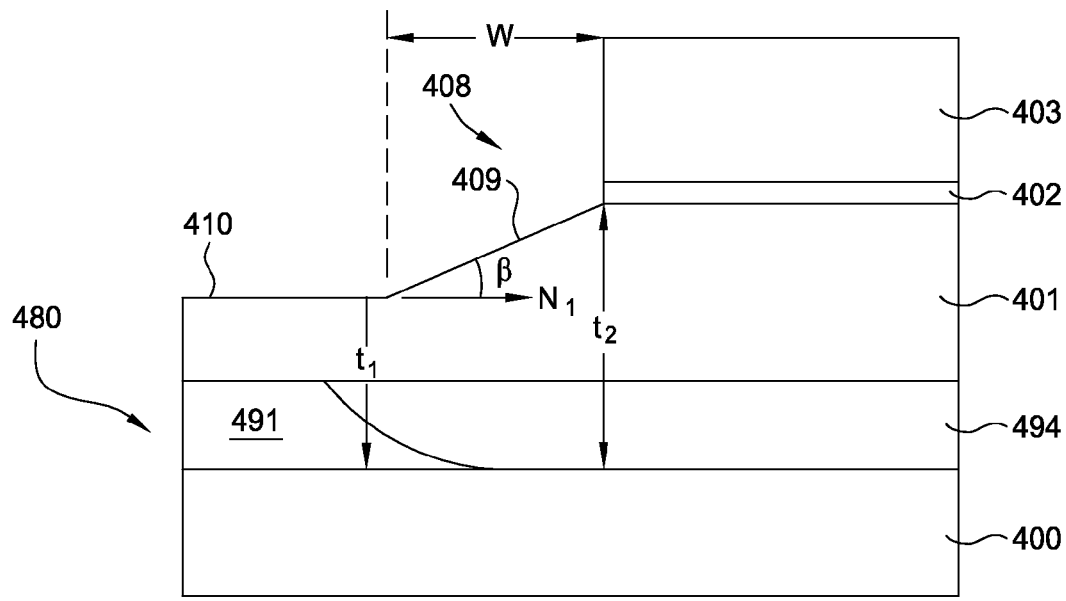

After the RIE process, the structure may be exposed to an ion milling process to form a tapered region in the third ferromagnetic layer 401. FIG. 4M illustrates a tapered region 408 that may be formed in the third ferromagnetic layer 401 as a result of the ion milling. As illustrated in FIG. 4M, write pole comprising the first, second, and third ferromagnetic layers 491, 494, and 491 may have a minimum thickness t1 proximate to an Air Bearing Surface (ABS) position 480, and a maximum thickness t2. The minimum thickness t1 may be around 90 nm in one embodiment. The thickness t2 may be between around 120 nm and 350 nm. The tapered region may also include a tapered surface 409, which may have an angle β with respect to a direction N1 normal to the ABS surface. In one embodiment, the angle β may be between around 10 degrees and 40 degrees. Furthermore, the width W of the tapered region may be between around 100 nm and 200 nm in one embodiment.

Figure 4N:
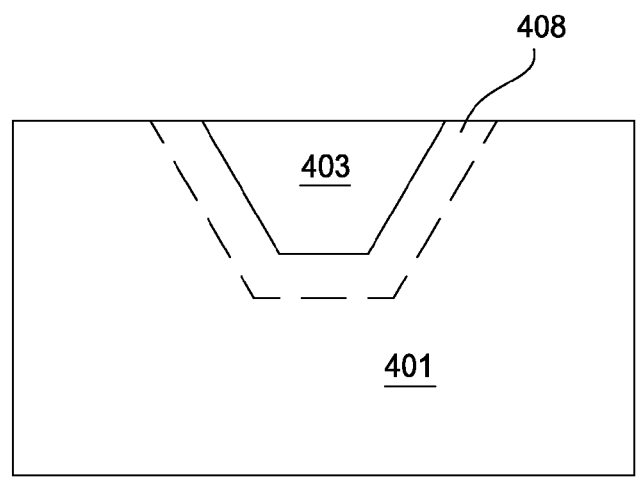

As illustrated in FIG. 4M, the ion milling step may also result in a surface 410 that is substantially normal to the ABS surface. As further illustrated in FIG. 4M, the ion milling process may remove the mask layer 404 and expose portions of the non-magnetic layer 403. The ion milling process may also reduce the thickness of the non-magnetic layer 403, in some embodiments. FIG. 4N illustrates a top view of the structure after the ion milling process. As illustrated in FIG. 4N, the ion milling process exposes the third ferromagnetic layer 401 and the patterned non-magnetic layer 403.

Figure 4O:
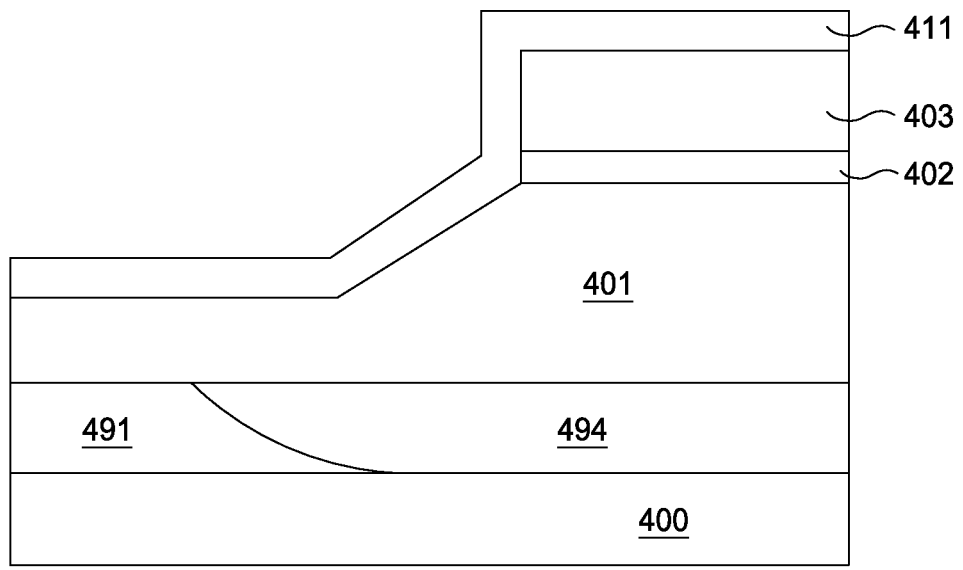

In one embodiment, a hard mask layer 411 may be deposited on the structure after the ion milling process. FIG. 4O illustrates the structure after deposition of the hard mask layer 411. The hard mask layer 411 may be formed with one or more of aluminum oxide, carbon, diamond like carbon, tantalum, tantalum oxide, titanium, titanium nitride, silicon nitride, silicon dioxide, or the like. In one embodiment, the hard mask layer may have a thickness between around 10 nm and 200 nm. In one embodiment, the hard mask layer 411 may completely cover exposed surfaces of the laminate layer 301 and the non-magnetic layer 403.

Figure 4P:
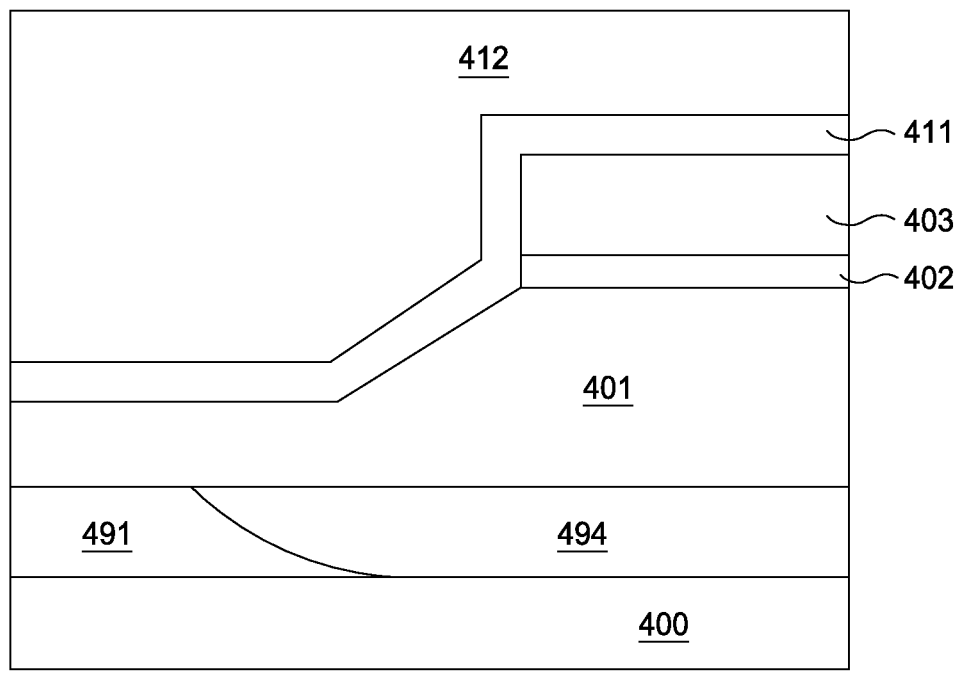
Figure 4Q:
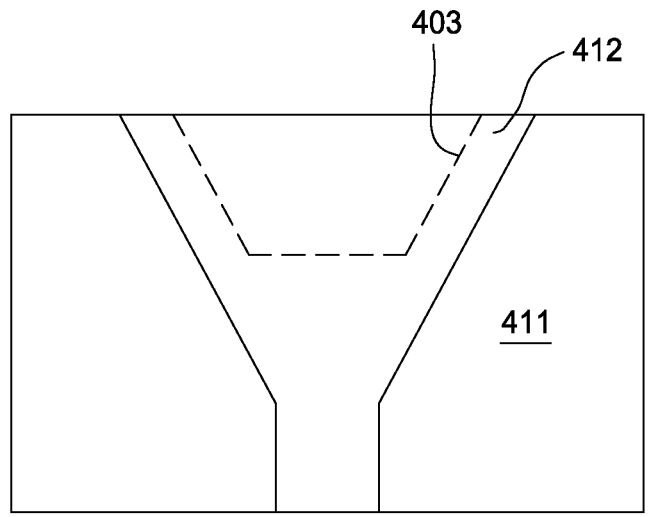

A mask layer 412 may be patterned on the hard mask layer 411, as illustrated in FIG. 4P. In one embodiment, the mask layer 412 may be a resist, Durimide under resist, or Durimide under hard mask which is patterned by a resist mask. FIG. 4Q illustrates a top view of the structure after deposition of the resist mask. As illustrated in FIG. 4Q, the resist mask may have a flared pattern that may correspond to the flared pattern of the write pole 220 illustrated in FIG. 2B. Furthermore, the mask layer 412 may completely cover portions of the structure comprising the non-magnetic layer 403, as illustrated in FIG. 4Q.

Figure 4R:
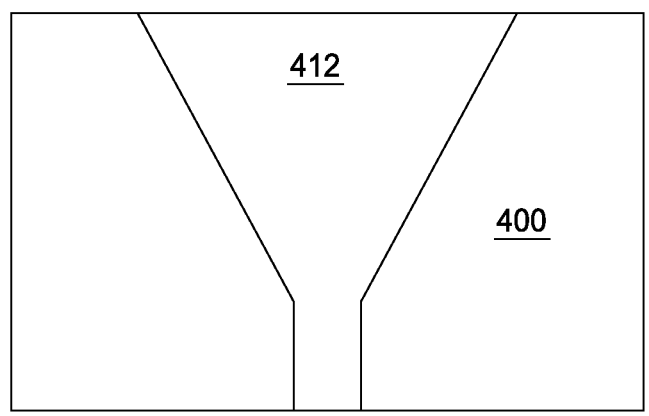

In one embodiment, the mask layer 412 may be used as a mask in an ion milling process to remove portions of the hard mask layer 411 and the laminate layer 401. FIG. 4R illustrates a top view of the structure after the ion milling process. As illustrated in FIG. 4R, the ion milling process may remove portions of the hard mask layer 411 and laminate layer 401 that are not under the mask layer 412, thereby exposing the substrate 400. After the ion milling process, the mask layer 412 may be stripped.

Figure 4S:
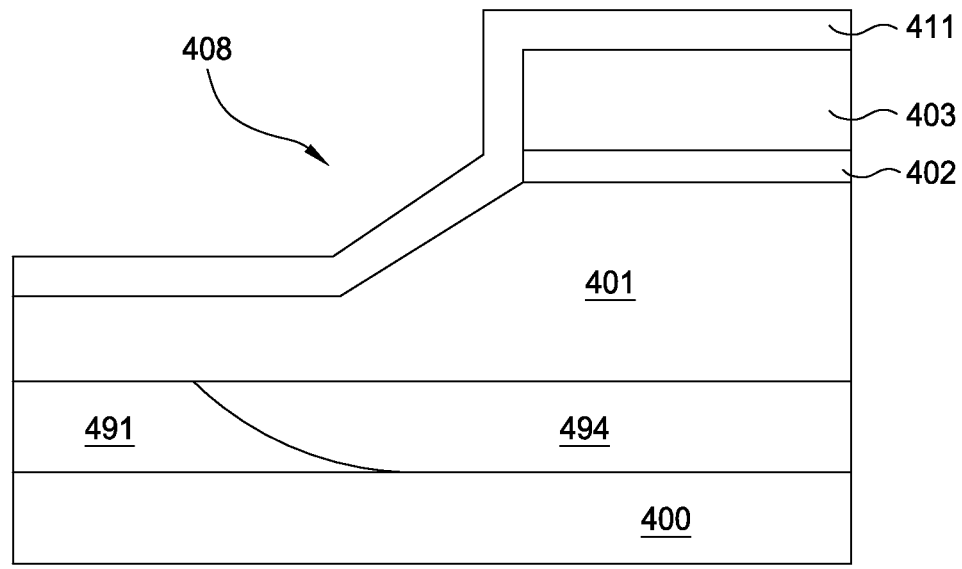

FIG. 4S illustrates a transverse view of the structure after the ion milling and mask layer strip process. As illustrated in FIG. 4S, the structure may include the third ferromagnetic layer 401 with the tapered region 408. The structure may also include the RIE stop layer 402 and a non-magnetic layer 403 formed on a portion of the third ferromagnetic layer 401. Furthermore, a hard mask layer 411 may be formed over surfaces of the third ferromagnetic layer 401, the non magnetic layer 403, and sidewall portions of the RIE stop layer 402 and the non magnetic layer 403, as illustrated in FIG. 4S.

Figure 4T:
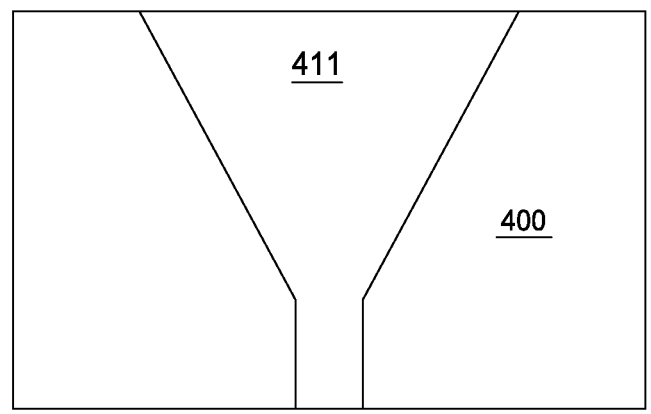
Figure 4U:
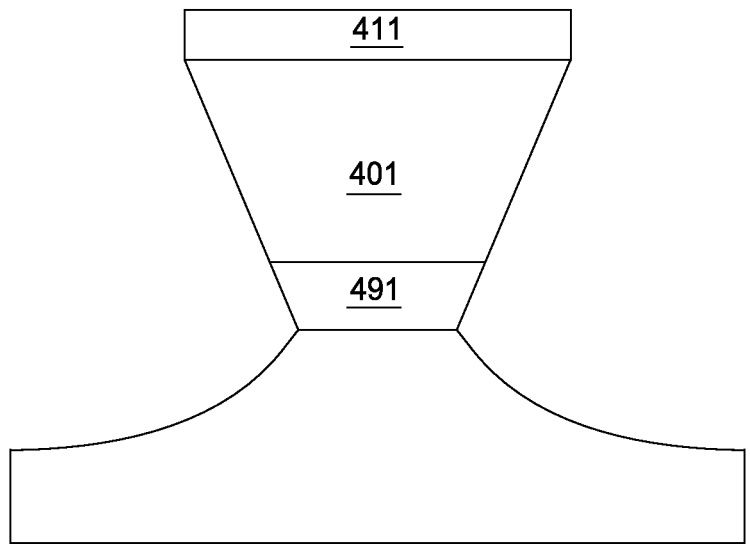
Figure 4V:
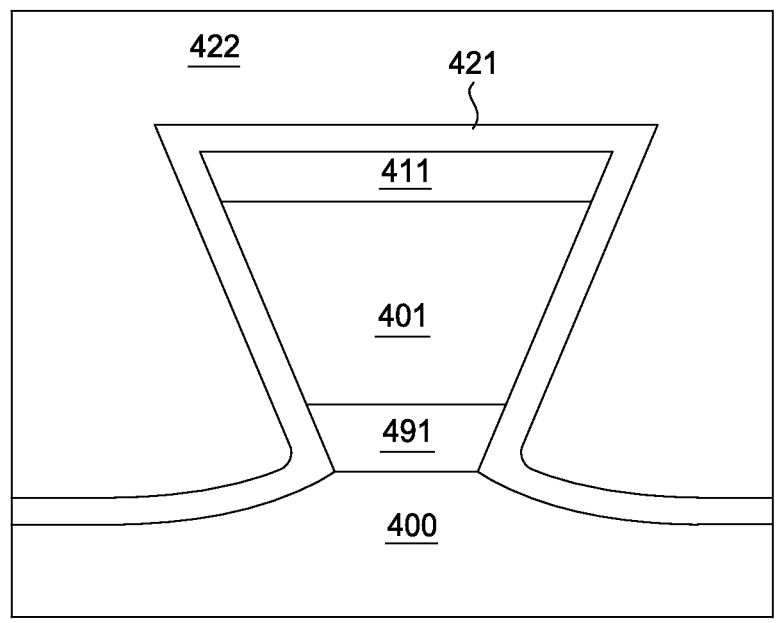

FIG. 4T illustrates a top view of the structure after stripping of the mask layer 412. As illustrated in FIG. 4T, the structure may include hard mask layer 411 formed in the shape of a tapered write pole. The laminate layer 401 under the hard mask layer may be an example of a write pole, e.g., the write pole 220 described hereinabove with reference to FIGS. 2A and 2B. FIG. 4U illustrates an ABS view of the structure. As illustrated in FIG. 4U, the write pole composed of the first ferromagnetic layer 491, third ferromagnetic layer 401, and second ferromagnetic layer 494 (not shown) may include a substantially trapezoidal shape at the ABS. Also illustrated in FIG. 4U is the hard mask layer 411 and the substrate 400 which are adjacent to the top and bottom surfaces respectively of the laminate layer 401.

In one embodiment, a non-magnetic layer 421 may be deposited on the structure illustrated in FIG. 4T. The third non-magnetic layer 421, shown in FIG. 4V may be formed with any suitable non-magnetic material, for example, aluminum oxide, Ruthenium, Tantalum, Nickel-Chrome, Chrome, or a combination thereof. In one embodiment of the invention, the thickness of the third non-magnetic layer 421 may be between around 15 nm and 35 nm. After forming the third non-magnetic layer 421, a shield layer 422 may be patterned on the non-magnetic layer 421 using conventional techniques, as illustrated in FIG. 4V. The shield layer may be formed with any suitable magnetic materials, for example, NiFe.

While the foregoing is directed to embodiments of the present invention, other and further embodiments of the invention may be devised without departing from the basic scope thereof, and the scope thereof is determined by the claims that follow.

What is claimed is:

1. A magnetic recording head, comprising:
   a write pole comprising:
      a first ferromagnetic layer having a first magnetic moment;
      a second ferromagnetic layer formed adjacent to a non-linear tapered sidewall portion of the first ferromagnetic layer such that the second ferromagnetic layer is coplanar with the first ferromagnetic layer on both leading and trailing edges, the second ferromagnetic layer having a second magnetic moment;
      a third ferromagnetic layer formed on the first ferromagnetic layer and the second ferromagnetic layer, wherein the third ferromagnetic layer has a third magnetic moment greater than the first magnetic moment; and
      an RIE stop layer formed on the third ferromagnetic layer, wherein the RIE stop layer comprises a material selected from the group consisting of Cr and NiCr.

2. The magnetic recording head of claim 1, wherein second magnetic moment is greater than the first magnetic moment.

3. The magnetic recording head of claim 1, wherein the first ferromagnetic layer is adjacent the leading edge of the write pole.

4. The magnetic recording head of claim 1, wherein the third ferromagnetic layer is adjacent the trailing edge of the write pole.

5. The magnetic recording head of claim 1, wherein the third magnetic moment is greater than or equal to the second magnetic moment.

6. The magnetic recording head of claim 1, wherein the third ferromagnetic layer comprises a tapered surface.

7. The magnetic recording head of claim 1, wherein the first ferromagnetic layer has a thickness between 30 nm and 60 nm.

8. The magnetic recording head of claim 1, wherein the first ferromagnetic layer comprises NiFe or CoFeNi alloys.

9. The magnetic recording head of claim 1, wherein the first magnetic moment is between 10 KG and 22 KG.

10. The magnetic recording head of claim 1, wherein the second ferromagnetic layer comprises CoFe or CoFeNi alloys.

11. The magnetic recording head of claim 1, wherein the second magnetic moment is between 22 KG and 24 KG.

12. The magnetic recording head of claim 1, wherein the third ferromagnetic layer comprises CoFe or CoFeNi.

13. The magnetic recording head of claim 1, wherein the third magnetic moment is between 22 KG and 24 KG.

14. A magnetic recording head, comprising:
   a write pole comprising:
      a first ferromagnetic layer having a first magnetic moment between 10 KG and 22 KG;
      a second ferromagnetic layer formed adjacent to a non-linear tapered sidewall portion of the first ferromagnetic layer such that the second ferromagnetic layer is coplanar with the first ferromagnetic layer on both leading and trailing edges, the second ferromagnetic layer having a second magnetic moment between 22 KG and 24 KG;
      a third ferromagnetic layer formed on the first ferromagnetic layer and the second ferromagnetic layer, wherein the third ferromagnetic layer has a third magnetic moment greater than the first magnetic moment; and
      an RIE stop layer formed on the third ferromagnetic layer, wherein the RIE stop layer comprises a material selected from the group consisting of Cr and NiCr.

15. The magnetic recording head of claim 14, wherein the third ferromagnetic layer comprises a tapered surface.

16. A magnetic recording head, comprising:
   a write pole comprising:
      a first ferromagnetic layer having a first magnetic moment, wherein a sidewall portion of the first ferromagnetic layer is a non-linear tapered sidewall;
      a second ferromagnetic layer formed adjacent to the non-linear tapered sidewall portion of the first ferromagnetic layer such that the second ferromagnetic layer is coplanar with the first ferromagnetic layer on both leading and trailing edges, the second ferromagnetic layer having a second magnetic moment;

a third ferromagnetic layer formed on the first ferromagnetic layer and the second ferromagnetic layer, wherein the third ferromagnetic layer has a third magnetic moment greater than the first magnetic moment, wherein the third ferromagnetic layer comprises a tapered surface; and an RIE stop layer formed on the third ferromagnetic layer, wherein the RIE stop layer comprises a material selected from the group consisting of Cr and NiCr.

17. The magnetic recording head of claim 16, wherein the first ferromagnetic layer comprises NiFe or CoFeNi alloys.

18. The magnetic recording head of claim 16, wherein the first magnetic moment is between 10 KG and 22 KG.

* * * * *